(12) United States Patent
Leppä et al.

(10) Patent No.: US 8,405,338 B2
(45) Date of Patent: Mar. 26, 2013

(54) METHOD FOR CONTROLLING AN ELECTRIC DRIVE

(75) Inventors: Ari Leppä, Nurmijärvi (FI); Jukka Gruzdaitis, Vantaa (FI)

(73) Assignee: ABB Oy, Helsinki (FI)

( * ) Notice: Subject to any disclaimer, the term of this patent is extended or adjusted under 35 U.S.C. 154(b) by 644 days.

(21) Appl. No.: 12/525,421

(22) PCT Filed: Feb. 5, 2008

(86) PCT No.: PCT/FI2008/000023
§ 371 (c)(1), (2), (4) Date: Nov. 10, 2009

(87) PCT Pub. No.: WO2008/096034
PCT Pub. Date: Aug. 14, 2008

(65) Prior Publication Data
US 2010/0106301 A1    Apr. 29, 2010

(30) Foreign Application Priority Data
Feb. 5, 2007    (FI) ...................................... 20070103

(51) Int. Cl.
*H02P 1/04* (2006.01)
(52) U.S. Cl. ......................... 318/461; 318/432; 318/434
(58) Field of Classification Search .................. 318/461, 318/432, 434
See application file for complete search history.

(56) References Cited

U.S. PATENT DOCUMENTS

| | | | | |
|---|---|---|---|---|
| 3,845,948 A * | 11/1974 | Furbeck et al. | ................. | 270/40 |
| 4,342,432 A * | 8/1982 | Lund et al. | ................. | 242/530.4 |
| 4,438,889 A * | 3/1984 | Schonmeier | ............... | 242/413.1 |
| 4,496,112 A * | 1/1985 | Olsson et al. | ............. | 242/413.1 |
| 4,565,334 A * | 1/1986 | Ruhl | .......................... | 242/413.3 |
| 4,977,466 A * | 12/1990 | Nakata | ........................ | 242/334.3 |
| 5,720,210 A * | 2/1998 | Okahashi | ........................ | 83/342 |
| 5,941,473 A * | 8/1999 | Kawano et al. | ............. | 242/413.1 |
| 6,315,229 B1 * | 11/2001 | Miyahara | .................... | 242/334.1 |

FOREIGN PATENT DOCUMENTS

| | | |
|---|---|---|
| JP | 57-137254 A | 8/1982 |
| JP | 58-029386 A | 2/1983 |
| JP | 61-037654 A | 2/1986 |
| JP | 1-321245 A | 12/1989 |
| JP | 4-012687 A | 1/1992 |
| JP | 5-008916 A | 1/1993 |
| JP | 6-304895 A | 11/1994 |

OTHER PUBLICATIONS

International Search Report (PCT/ISA/210) for PCT/FI2008/000023 dated Jul. 21, 2008.

* cited by examiner

*Primary Examiner* — Rina Duda
(74) *Attorney, Agent, or Firm* — Buchanan Ingersoll & Rooney PC

(57) ABSTRACT

The invention discloses a method for controlling an electric drive that drives reels of a slitter in the paper machine. In the method at least speed and acceleration/deceleration of a slitter is controlled. According to the invention a limit value of the electric drive is defined in the method, values of at least two or more parameters effecting to the electric drive is monitored, a reference value of the acceleration/deceleration is defined on the basis of at least two parameters, and the electric drive is controlled so that the acceleration/deceleration corresponds to the highest possible reference value, by which the reference value of the acceleration/deceleration defined on the basis of any parameter is not exceeded, and that the limit value of the electric drive is not exceeded.

16 Claims, 4 Drawing Sheets

METHOD FOR CONTROLLING AN ELECTRIC DRIVE

FIELD

The invention relates to a method for controlling an electric drive that drives drums of finishing machines, such as drums in slitters, rereelers and rewinders. The invention also relates to a method for controlling an electric drive.

BACKGROUND

When manufacturing paper the machine reel, so called tambour reel, made by the paper machine and having the width of the paper machine, is cut by the slitters to customer reels, whose width and length or diameter is desired. The machine reel has a width and a diameter that is in accordance with the dimensioning of the paper machine. During the slitting the machine reel is reeled off, is slit to webs with desired width and the webs are reeled on the customer rolls that have the length and width according to the order. The finishing machine reels are generally controlled by frequency converter drives, or by other controllable devices wherein the drive motors controlling frequency converters control the rotation speed of the motors according to the given control parameters so that the completed customer rolls fulfill the requirements of the end user or upgrading as regards to their outer overall dimensions and their inner structure.

Typically, the customized rolls are reeled by the slitter and the widths and lengths the customized rolls are varying according to the orders. It is characteristic of the paper manufacture that the manufacturing process is continuous and it is not possible to create a large intermediate storage for unfinished products without interruption of the process or without slowing down the process. The slowest part of the process and the production chain determines thus the total speed of production and the capacity of the factory.

The slitting is a factor of essential importance as a point of view of the efficiency and smoothness of the production and its plan and implementation has been paid attention. The changeover time of the finished rolls is tried to decrease and the efficiency of the production is tried to upraise. Earlier e.g. control methods are known, whereby the reels are controlled to stop as exact as possible in order to achieve the desired length of the web or the desired diameter of the roll. According to the general principle known earlier the acceleration and the deceleration are chosen according to the pre-calculated worst situation without dependence on temporary parameters.

In connection of the conventional paper machine drives the dimensioning values of the paper machine are used as a defining control variable. Thus the highest allowable speed or acceleration of the reel are defined on the basis of the design values of the paper machine, wherein the defining factor is the required power that must be able to achieve but that must not be exceeded.

SUMMARY

The goal of the present invention to create a new control of the slitter and its electric drive so that the efficiency of the slitter increases and the slitting corresponds better to the increasing speed of the paper manufacturing process.

In the method according to the invention a limit value for the electric drive is defined, at least two or more several value of parameters effecting to the electric drive is monitored, the reference value of the acceleration/deceleration is defined on the basis of at least two parameters and the electric drive is controlled so that the acceleration/deceleration corresponds to the highest possible reference value; by which the reference value of the acceleration/deceleration defined on the basis of any parameter is not exceeded, and that limit value defined for the electric drive is not exceeded.

According to an alternative method of the invention the maximum reference value of the acceleration/deceleration is defined in the prevailing load or drive situation of the finishing machine, whereby a maximum value is defined for at least two characteristic quantities of the finishing machine's components in the prevailing load or drive situation within the limits of the design values of the characteristic quantity, the reference values of the acceleration/deceleration are defined corresponding to these maximum values of the characteristic quantities, from the group of the defined reference values corresponding to the maximum values of the acceleration/deceleration the value is chosen as the maximum reference value of the acceleration/deceleration that is critical, and the reel of the finishing machine is controlled by the chosen maximum reference value.

When using the slitter's control method according to the invention the overall capacity of the slitter increases significantly. By increasing the start and end accelerations the manufacturing time of one customer roll decreases(increases) by several percent. The slitting being one of the critical factors of the paper manufacturing the saving in time and the speed-up that have come true will effect to the whole paper manufacturing process and its productivity. In the furthest case it is even possible that the purchase of another slitter can be avoided. Advantageously, the electric drive is dimensioned such that the worst possible drive situation can be mastered, but the dimensioning of the whole electric drive is not increased because of any single control variable.

According to one advantageous implementation of the invention the electric drive is controlled by the parameters that limit the performance at each moment. The largest possible capacity of the slitter is utilized when the control parameters are defined case by case according to the prevailing circumstances.

According to one implementation of the invention the limit value of the electric drive is the maximum torques and the maximum powers of the targets of usage and the maximum powers of the system.

According to an advantageous feature of the invention the parameter is one or several of the group: density of paper, web speed, tightness of web, diameter of on-reeler, diameter of unwinder, width of web, thickness of paper, inertia masses of system, friction losses, input voltage, electrical losses, efficiency, type of input devices, load distribution between reel sets, overload capacity of system's components, cabling of system, supply transformer, limitations of mechanics or limitations of process.

According to one advantageous feature of the invention the reference value of acceleration and the reference value of deceleration are defined at least partly on the basis of different parameters.

According to one further implementation the reference value of acceleration is defined during acceleration and the reference value of deceleration is defined during deceleration.

According to one further implementation the reference value of acceleration/deceleration is dated continuously and the electric drive is controlled by the newest reference value. Further the maximum values of the characteristic quantities are defined continually during the drive. Further different characteristic quantities are used in different drive circumstances during one drive.

BRIEF DESCRIPTION OF THE DRAWINGS

The invention will be described in detail with the aid of certain implementations referring to the drawings where.

DETAILED DESCRIPTION

Figure 1:
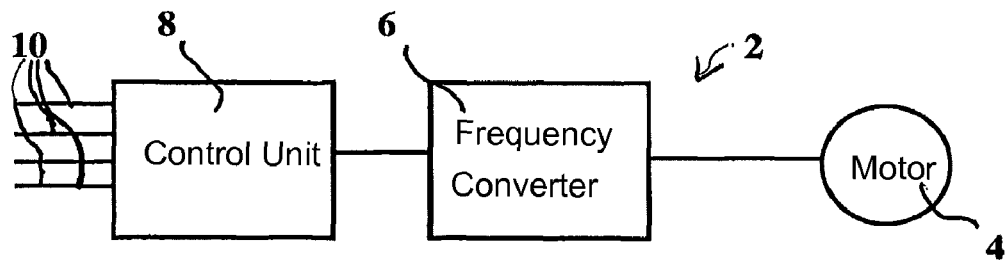
FIG. 1 is a schematic illustration of one drive according to the invention.

The FIG. 1 illustrates schematically an electric drive 2, where the method according to the invention can be applied. In the drive the reel of the slitter is rotated by a motor 4, which is controlled by a frequency converter 6. The slitter typically comprises several reels, motors rotating the reels, whereby the motors are coupled to a common line drive. The measuring and control devices of the slitter give data of the paper's density, data of the web speed, data of the web tightness and the data of the diameters and frictions of the paper rolls, like un-winder and on-reeler as well known in the art. This data is forwarded to the inputs 10 of the control unit 8 in the frequency converter. The measurement occurs advantageously in real time. Thus the highest allowed acceleration or deceleration, i.e. the reference values of the acceleration and deceleration can be defined on the basis of the measurement in each driving situation in such a way that the torque limit defined according the electric drive's dimensioning is not exceeded.

Figure 2:
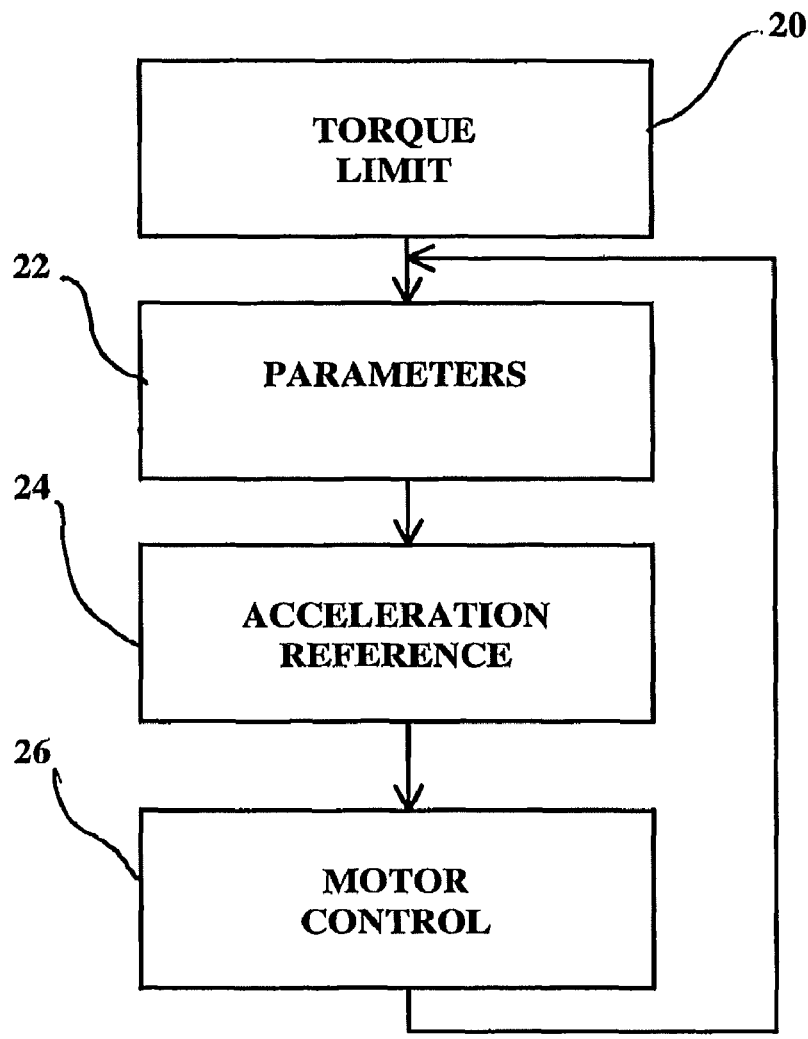
FIG. 2 illustrates the flow chart of a method according to the invention.

In the FIG. 2 the principle of a control method according to the invention is described as a flow chart. In the block 20 it is defined based to the data of the dimensioning of the paper machine the torque limit of the electric drive that the drive must not exceed. The values of the parameters, which effect to the control of the electric machine, are read or defined from the measuring data of the paper web (block 22). During the acceleration and deceleration phase the importance has the factors effecting to the torque of the electric drive, like tightness of the paper web, instantaneous values of the diameters of the paper rolls and the data of the paper density. The speed of the roll also is measured in the beginning of the inspection and control period as well as the target speed. In addition it is defined the duration of temporary overload of the electric motor and of the frequency converter and the overload cycle. The acceleration command of the motor is generated by the updated data (block 24) in such a way that no allowable maximum value is exceeded. Because there simultaneously are several factors that effect to the control it is also considered which factor is critical, and the value defined according to the critical factor is chosen as the acceleration command as will be described later in detail. The motor is controlled by the frequency converter (block 26) according to the chosen command. The control cycle is repeated continuously, until the rolling sequence has finished.

Though the updating of the control data occurs continuously in the example of the FIG. 2, it should be understood that according to the invention one acceleration command can be used from the zero speed to the full speed during one acceleration sequence, for example, and correspondingly, from the full speed to the zero speed during one deceleration sequence.

Figure 3:
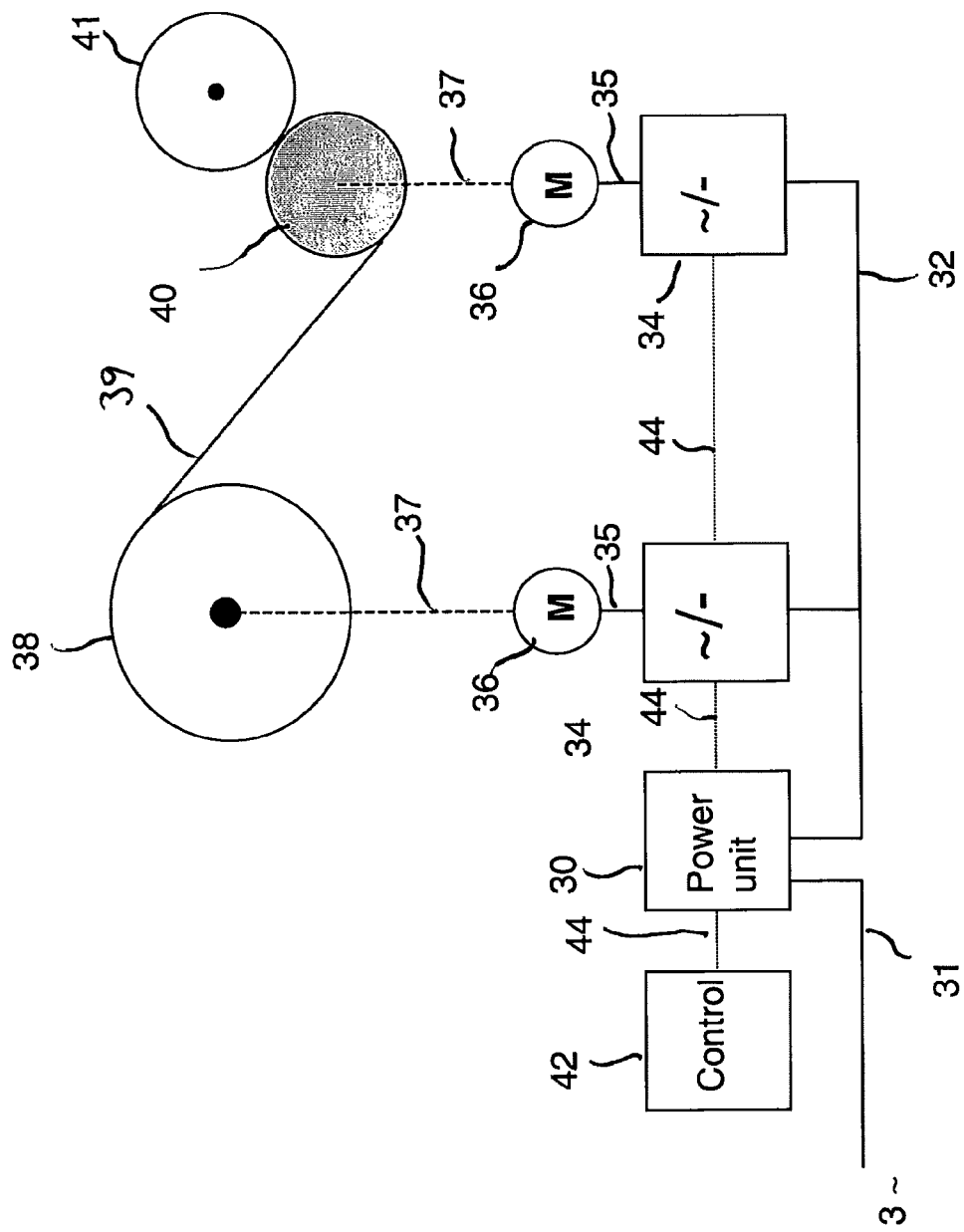
FIG. 3 is a schematic illustration of one drive according to the invention.

The FIG. 3 illustrates one finishing machine of paper machine in principle, which utilizes the solution according the invention. It should be noted that in the figure there are described only the main components whose characteristic values are utilized in the invention and/or whose acceleration/deceleration is controlled. Accordingly, the parts that belong in the known manner to the finishing machine, like winders, joining devices of web or corresponding devices are not shown. The electric power required by the apparatus is fed to the supply unit 30 via the three phase cables 31 from the mains. The supply voltage is rectified by the mains rectifiers of the supply unit and the rectified voltage is lead to the DC bus 32 of the line drive. Several frequency converters 34 are coupled to the DC bus. The frequency converters control the frequency of the voltage supplied to the AC motors 36 via the cables 35 in order to control the rotating speed and the torque in accordance with the load of the motor. The reels of the finishing machine, i.e. the reel 38 of the unwinder and the reel 40 of the on-reeler are mechanically coupled to the shafts 37 of the motors 36. On the reel of the unwinder there is the machine roll made in the paper machine and the paper web 39 is reeled to the customer rolls 41 by the on-reeler 40. The control system 42 controls the electric components of the finishing machine, such as supply unit 30, the frequency converters and motors as visualized by the dash line 44. According to the well-known technique the control system determines the acceleration, the target speed, by which as long as possible is aimed to drive, and the deceleration, when a new roll is started to drive on the reel of the on-reeler. The control system uses the acceleration and speed commands when defining for the finishing machine the pre-defined design values that have been an the basis of the most demanding situation. By this it has been guaranteed that the allowed stresses of any component, like motor, frequency converter or mains rectifier are exceeded in no occasion.

Figure 4:
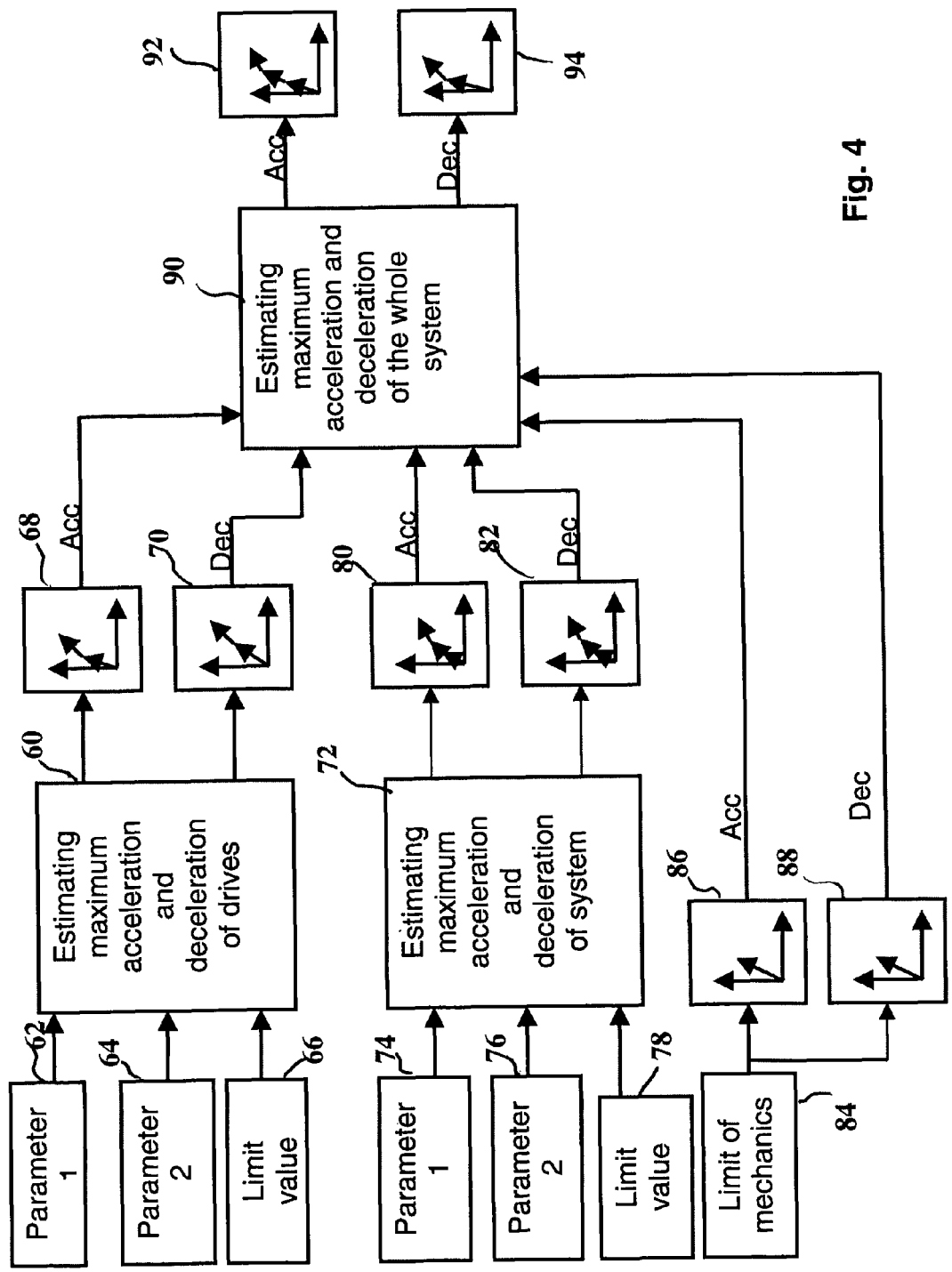
FIG. 4 illustrates the schematic diagram of the control according to the FIG. 3.

In the FIG. 4 there is illustrated as a schematic diagram an embodiment, which implements a solution according to the invention. In the control unit of the finishing machine the reference values for the reels' acceleration and deceleration are created by which reference values the reels are rotated. In block 60 there are calculated the reference values of the acceleration and deceleration according to the drives, i.e. according to the design, the efficiency and the loading capacity of the motors and the frequency converters. The input values of the block 60 are the parameters that effect to the operation of the drives. In the embodiment of the FIG. 4 the blocks 62 and 64 are these kinds parameters. In addition as an input there is limit value 66 that comes from the own design of the drives. The output of the block 60 gives the reference values of the acceleration and the deceleration that are illustrated in the blocks 68 and 70. Simultaneously the maximum acceleration and deceleration allowed by the system design is calculated in the block 72. On the basis of the instantaneous values of the parameter 74 and the parameter 76 the reference values of the acceleration and deceleration are calculated. By the design limit value of the system (block 78) the reference values are limited respectively as above and the output of the block gives the acceleration and deceleration commands in the blocks 80 and 82 as the result of the system design and the parameter values. The mechanics of the finishing machine, like the structure of the reels and the bearings define additionally the limit values (block 84) that are utilized when calculating the third reference values for the acceleration (block 86) and for the deceleration (block 88). All the three acceleration commands, respectively deceleration commands are thus reference values that either the drive, the system or the mechanics can carry out themselves, if there is no need to take account the effect of the other two factors.

In the block 90 the acceleration commands of the drive, the system and the mechanics are combined so that at each moment the command is valid whose instantaneous value is the lowest. The output of the block 90 is thus acceleration command curve (block 92), whose instantaneous value corresponds the smallest instantaneous value of the acceleration commands 68, 80 and 86. Correspondingly, the instantaneous values of the deceleration command curve are the lowest of the deceleration commands 70, 72 and 88.

Figure 5:
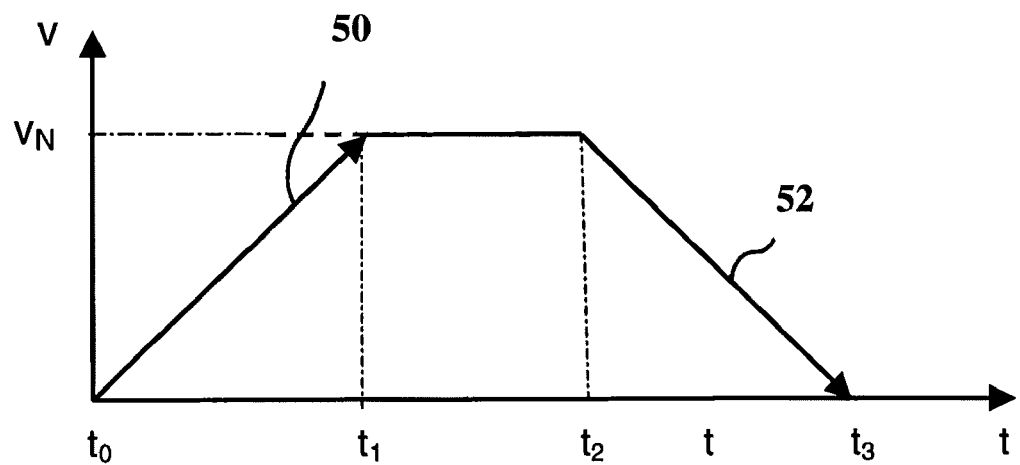
FIG. 5 illustrates speed as a function of time of one conventional drive and FIG. 6 illustrates speed as a function of time of the drive according to the invention.

When the reels are reeled using the conventional control the reels are at first accelerated to the constant speed by a acceleration ramp, the reels are driven by the constant speed and the reels are decelerated to stop by deceleration ramp. The FIG. 5 describes the principle of speed variation during one drive cycle. The reel is accelerated by a ramp illustrated by the line 50 from time $t_0$ to $t_1$ up to the rated speed $v_N$. The slope of the ramp or the acceleration is defined beforehand on the basis of the design values so that the maximum allowed values are not exceeded for any component. From time $t_1$ to $t_2$ the drive speed is constant and the end deceleration is started at the moment $t_2$, by the deceleration ramp shown by the line 52, whereby the reeling ends at the moment $t_3$, when the requested diameter of the customer roll is reached. The acceleration and deceleration ramps are naturally aimed to be controlled as steep as possible so that the period of the constant speed would be as long as possible and the total time as short as possible. If the design values of the finishing machine, like the size of the supply transformer, the loading capacity of the frequency converters or the motors, are upraised, the acceleration and deceleration ramps can be made steeper, whereby the constant speed drive can last longer. The shortening of the drive cycle requires a remarkable addition in dimensioning.

Figure 6:
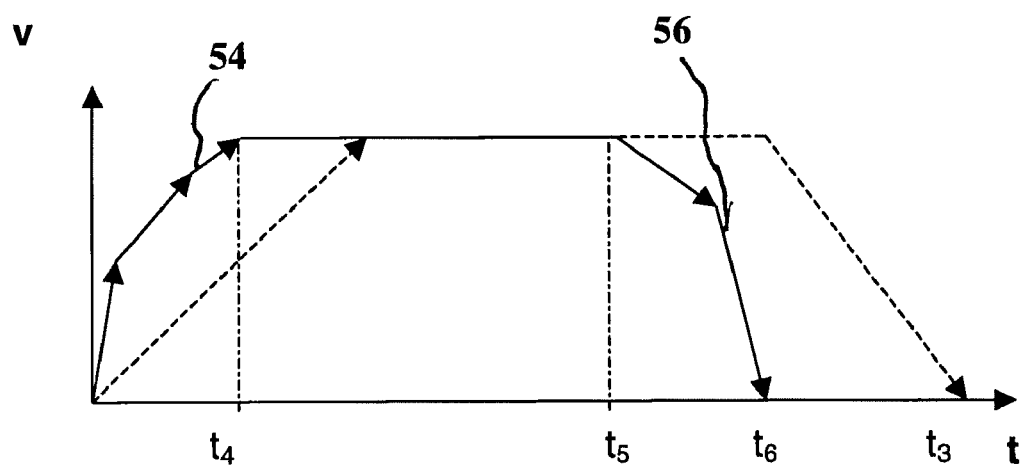

In order to illustrate the presentation the acceleration commands are drawn in to the same set of curves in the FIG. 6. Accordingly, the start acceleration occurs according to the fraction line 54 up to the moment $t_4$. After it the constant speed drive lasts to the moment $t_5$. The deceleration occurs according to the fraction line 56 during the period from $t_5$ to $t_6$. In the Figure the dash line illustrates the curve of the FIG. 5.

The invention has been above described with the aid of certain embodiments. However, the implementation of the invention may vary within the limits of the following claims.

The invention claimed is:

1. A method for controlling an electric drive of a paper machine having an electric motor and a converter for control of the motor, the method comprising:
    controlling at least speed and rate of change in speed of a slitter;
    defining a limit value of the electric drive, the limit value being defined for the entire electric drive including the electric motor and the converter for controlling the motor of the electric drive;
    monitoring values of at least two or more parameters associated with the electric drive;
    defining a reference value using a maximum rate of change that is based on the at least two parameters; and
    controlling the electric drive using the reference value, wherein the reference value is defined such that the limit value of the electric drive is not exceeded.

2. A method according to claim 1, wherein the limit value of the electric drive is a maximum torque of a drive point and a maximum power of the electric drive.

3. A method according to claim 1, wherein the parameters are selected from the group consisting of: density of paper, web speed, tightness of web, diameter of on-reeler, diameter of unwinder, width of web, thickness of paper, inertia masses of system, friction losses, input voltage, electrical losses, efficiency, type of input devices, load distribution between reel sets, overload capacity of electric drive components, cabling of system, supply transformer, limitations of mechanics and limitations of process.

4. A method according to claim 1, wherein separate reference values are defined for acceleration and for deceleration at least partly on the basis of different parameters.

5. A method according to claim 1, wherein a separate reference value for acceleration is defined when accelerating and another reference value for deceleration is defined when decelerating.

6. A method according to claim 1, wherein the reference value of the rate of change is updated continuously and the electric drive is controlled by a newest reference value.

7. A method according to claim 1, wherein the electric drive drives a reel in a finishing machine.

8. A method according to claim 1, wherein the limit value includes a torque limit for the electric drive.

9. A method according to claim 1, wherein the limit value defined for the entire electric drive is an overall control value for ensuring that a rated value of the entire electric drive is not exceeded when the at least two or more parameters associated with the electric drive are controlled.

10. A method for controlling an electric drive of a paper machine to control a rate of change of speed of a reel, which paper machine contains several components including at least a motor rotating the reel, a converter controlling the motor, mains supplying the converter and paper to be wound on the reel, the method comprising:
    defining a reference value of the rate of change at a maximum rate of change for a prevailing loading and drive situation of the paper machine, the reference value defining a maximum power or torque for the paper machine including the motor rotating the reel, the converter controlling the motor, the mains supplying the converter and paper to be wound on the reel, whereby the reference value is defined for at least two characteristic quantities of the paper machine's components in the prevailing loading and drive situation within limits allowed by design values;
    setting the reference value in accordance with the maximum for the characteristic quantities, from among a group of reference values; and
    controlling the reel by the set reference value.

11. A method according to claim 10, wherein the maximum is selected according to the characteristic quantities continuously during the drive.

12. A method according to claim 10, wherein the characteristic quantities are two or several of the group consisting of: density of paper, web speed, tightness of web, diameter of on-reeler, diameter of unwinder, width of web, thickness of paper, inertia masses of system, friction losses, input voltage, electrical losses, efficiency, type of input devices, load distribution between reel sets, overload capacity of system's components, cabling of system, supply transformer, limitations of mechanics or limitations of process.

13. A method according to claim 10, wherein different characteristic quantities are used in different drive situations during one drive.

14. A method according to claim 10, wherein the electric drive drives a reel in a finishing machine.

15. A method according to claim 10, wherein the limit value includes a torque limit for the electric drive.

16. A method according to claim 10, wherein the reference value defined for the paper machine is an overall control value for ensuring that a rated value of the entire paper machine is not exceeded when the at least two characteristic quantities of the paper machine's components are controlled.

* * * * *